D. E. KRAUSE.
BEAN CLEANER AND SORTER.
APPLICATION FILED JUNE 8, 1914.
1,146,174.
Patented July 13, 1915.
4 SHEETS—SHEET 1.
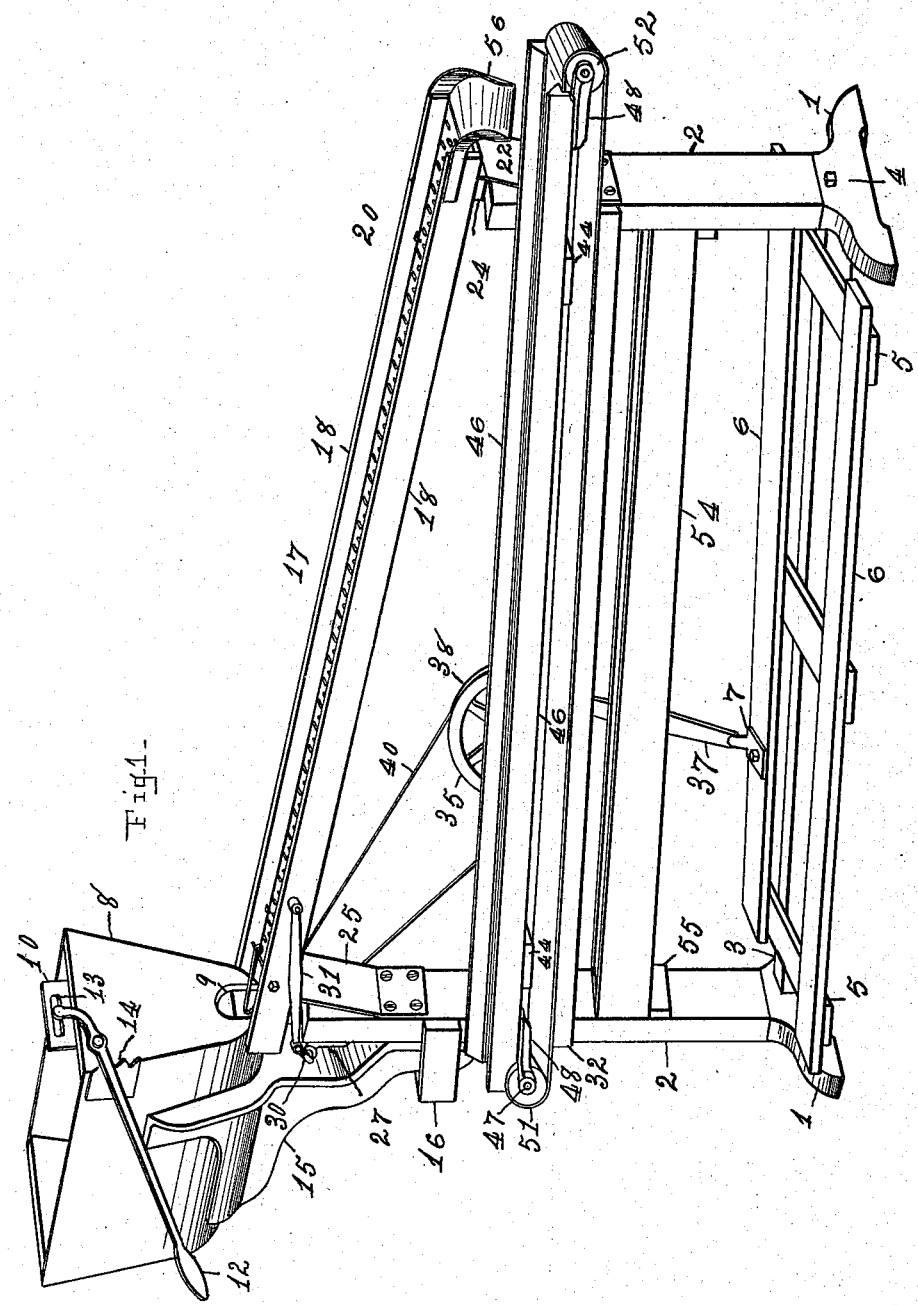
WITNESSES:
C. M. Albee.
K. G. Pickert
INVENTOR.
Daniel E Krause.
BY
G. H. Albee.
ATTORNEY.

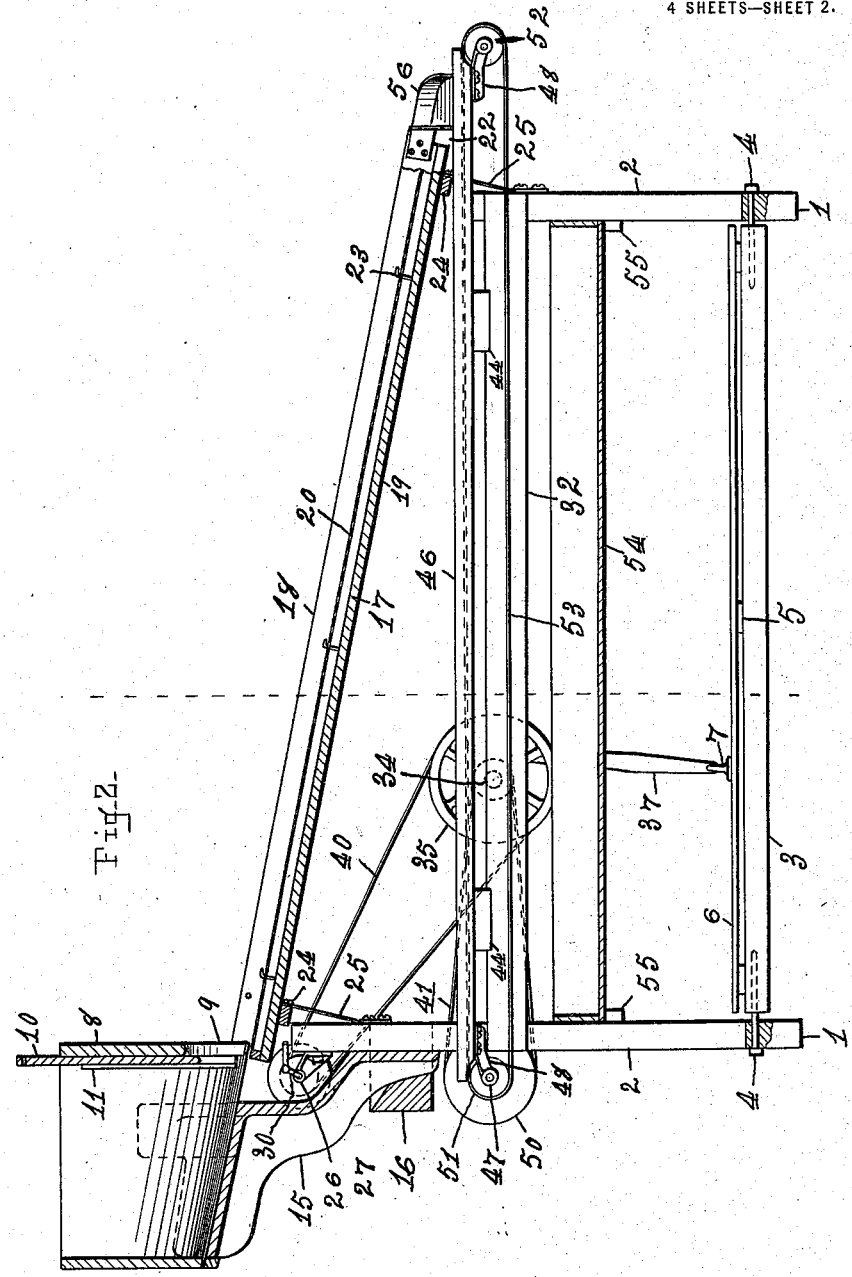

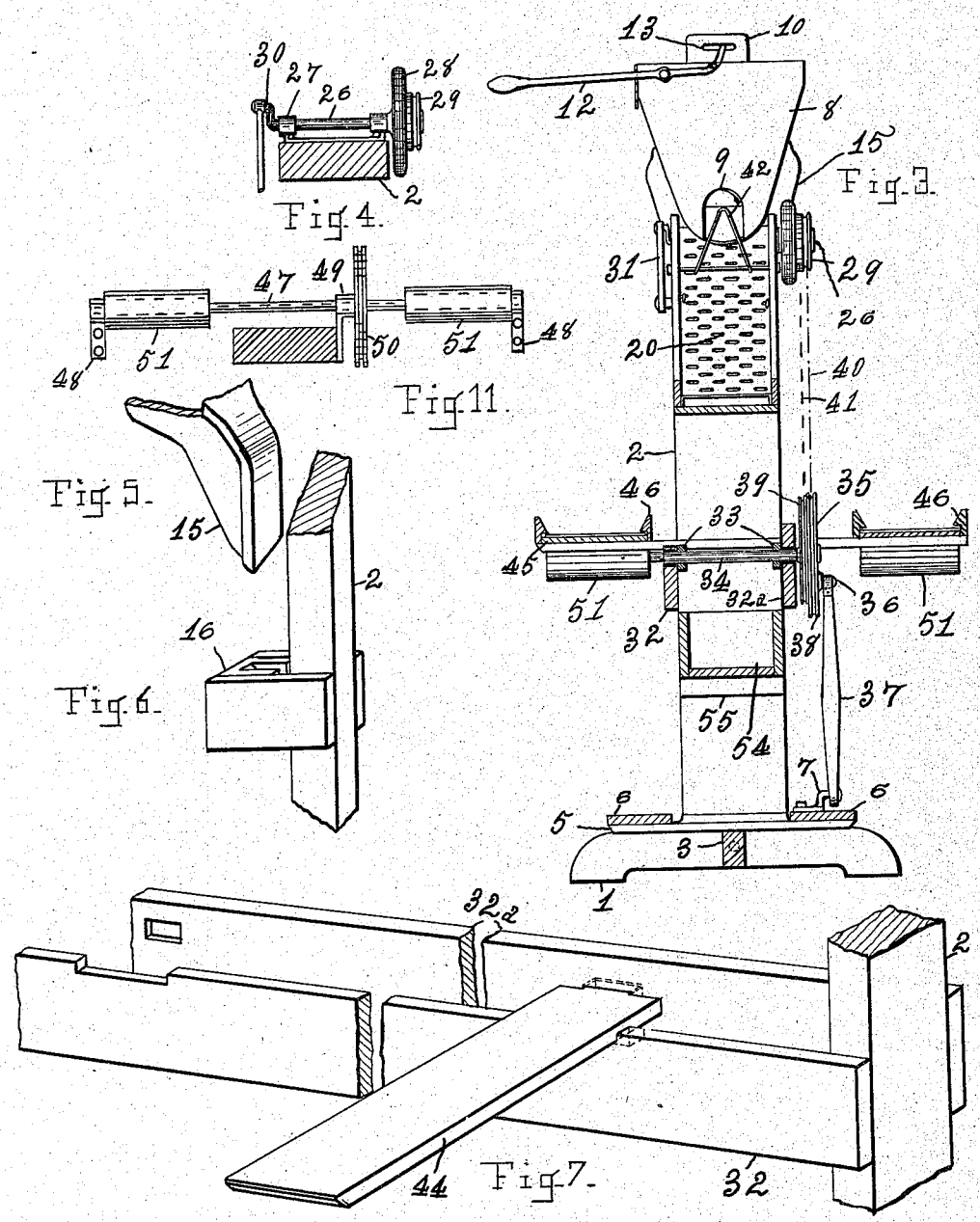

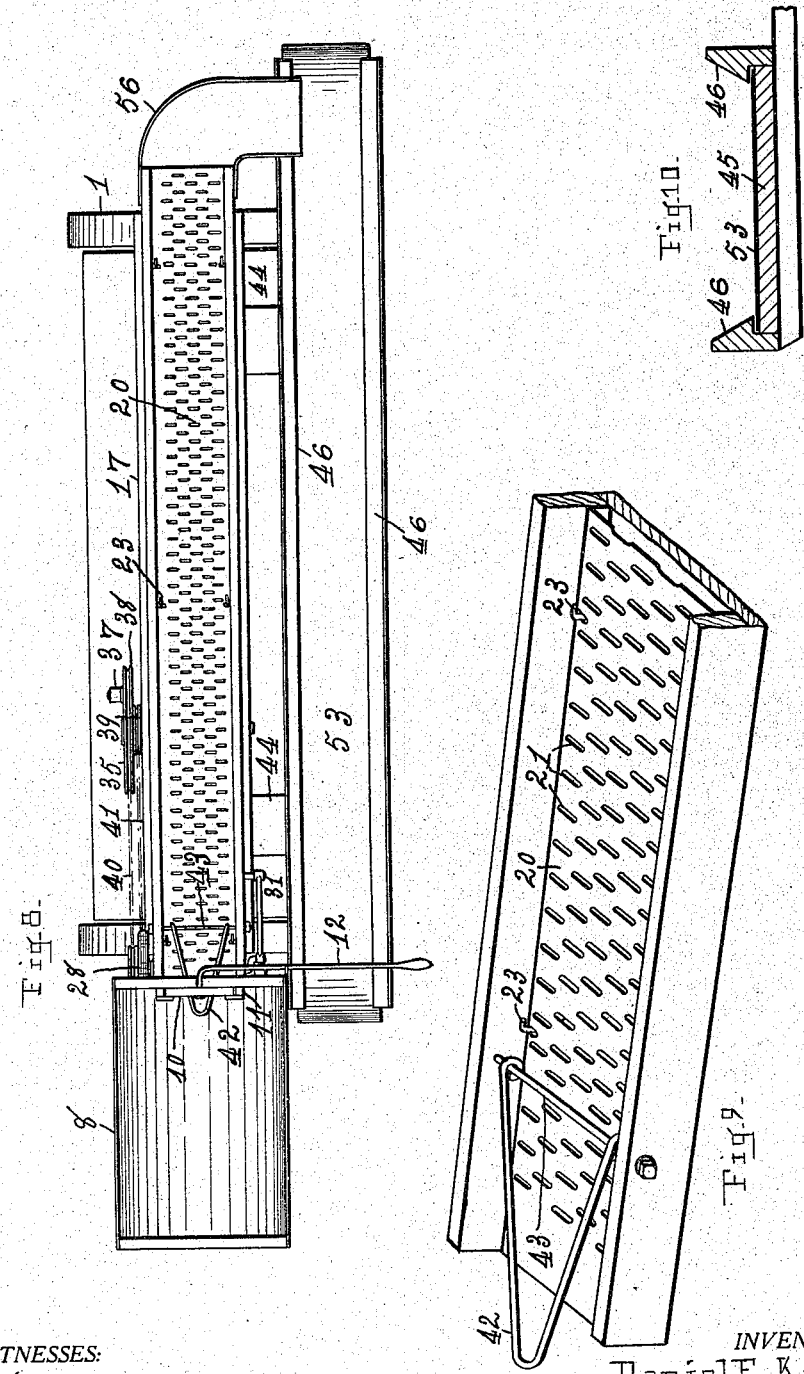

UNITED STATES PATENT OFFICE.

DANIEL E. KRAUSE, OF SOBIESKI, WISCONSIN.

BEAN CLEANER AND SORTER.

1,146,174.

Specification of Letters Patent.

Patented July 13, 1915.

Application filed June 8, 1914. Serial No. 843,805.

*To all whom it may concern:*

Be it known that I, DANIEL E. KRAUSE, a citizen of the United States, residing at Sobieski, in the county of Oconto and State of Wisconsin, have invented a new and useful Bean Cleaner and Sorter, of which the following is a specification.

My invention relates to a machine by which beans and similar agricultural products may be subjected to a hand picked or sorting process, which the best dealers in such products now demand, the beans at the same time being cleaned of dirt and all very small beans eliminated before they arrive at the sorters, and it consists of a light portable frame for manually operated machines of a capacity for employing from three to six or eight sorters, but for machines for elevator plants and power driven, employing a dozen or more operatives some parts of the machines may require to have their weight increased. The frame is provided with a hopper for receiving shelled beans, a shaker arranged in an inclined position which receives the beans from the hopper, screens them of dirt and many imperfect beans and delivers them upon a horizontally arranged conveyer along which a plurality of persons sit while the beans are carried past them so slowly that ample time is given for them to pick out all defective ones and throw them into a box below the conveyer while the perfect ones are carried to the end of the conveyer and fall into any utensil placed there for their reception. In manually operated machines, one of the sorters operates a treadle for driving the shaker and conveyer, while another may attend to filling the hopper and removing the perfect beans.

The invention is shown in the accompanying drawing in which,—

Figure 1 is a perspective view of the machine. Fig. 2 is a side elevation of the same, parts being in section. Fig. 3 is a vertical cross section of the machine upon line $a, a,$ of Fig. 2, as it appears in looking toward the left, a sorting trough being arranged upon each side of the shaker. Fig. 4 is a plan of the crank shaft and its balance wheel and pulley attached to a post of the frame. Fig. 5 is a perspective view of the lower end of a cast metal bracket for supporting the hopper. Fig. 6 is a perspective view of a socket for receiving the lower end of the bracket, attached to a post of the frame. Fig. 7 is a perspective view of a fragment of the machine frame which supports the conveyer trough. Fig. 8 is a plan of the device having a sorting trough upon one side only of the shaking trough. Fig. 9 is a perspective view of a fragment of the shaker trough. Fig. 10 is a cross section of the shaker trough. Fig. 11 is a plan of the conveyer trough shaft at its driving end, arranged for a conveyer on each side of the shaker.

Similar numerals indicate like parts in the several views.

1, indicates feet of the frame; 2, posts or legs, one at each end thereof; 3, a treadle bar which is pivotally mounted upon screw bolts 4 in the feet of the frame; 5, treadle board cross supports, one near each end of the bar; 6, treadle boards; 7, a treadle connecting plate secured to one of the treadle boards; 8, a hopper which may in light manually operated machines, be formed of light sheet metal and in larger and power driven machines, of other suitable material. The description throughout will be for a light manually operated machine designed for from three to eight sorters and for power driven machines for a dozen or more operators, the machines will be the same excepting that some parts may need to be heavier, the same general design being adapted for the small farmer and for the large farmer and elevator plants. The hopper is preferably made with a curved bottom so that the entire lot of beans can be taken from it. An opening 9, is made at one end of the hopper and a slide 10, is fitted to slide vertically in guides 11, for closing the opening. A lever 12, is pivotally mounted upon the hopper with one end engaged with the slot 13, in the upper end of the slide and the other arranged in a position easily reached by one of the operators when seated. A serrated edged plate 14, is secured to the hopper with which the lever can be engaged for holding the slide in the desired position. The hopper is supported upon a leg or post 2 by means of a metallic bracket 15, which is fitted to have its lower end inserted within a holder 16, which is attached to the post 2.

Under the opening 9, one end of the shaker trough 17, is arranged upon an inclination, it being long and narrow. It consists of sides 18, a bottom 19 and a sheet metal bottom 20, spaced above the bottom 19, the sheet metal bottom being provided with a series of oblong perforations 21 with their greatest length arranged transversely of the trough and their width insufficient for permitting the average perfect bean of those being sorted to pass through them, the small beans, split ones and gravel and dirt passing through and falling upon the bottom board 19 and sliding to its lower end at 22, where they fall into any receptacle for receiving the refuse. The perforated sheet can be secured to the shaker sides with staples 23, or otherwise. Near each end of the shaker trough, a piece 24 is secured to its bottom 19, to which the upper end of a sheet metal spring plate 25 is secured, their lower ends being secured to a post 2, and the shaker is supported upon said spring plates. Near the upper end of the shaker trough a shaft 26 is arranged for revolution in journal boxes 27, which extend to the left of the left hand post 2, and are secured thereto. The shaft is provided with a balance wheel 28, and pulley 29 upon one end and a short throw crank 30, (about the major fraction of an inch throw), at the other end, from which a rod 31 extends to the shaker. (See Fig. 1.) This shaft being revolved at a suitable speed a series of short rapid strokes is produced and the beans as they are carried downward over the perforations are relieved of the imperfect and split beans and refuse to a great extent.

Upon the side edges of the posts 2 at an equal distance from their lower ends, narrow boards 32 and 32a are secured, and intermediate their ends in journal boxes 33, a shaft 34 is arranged for revolution. Upon one end of the shaft a balance wheel 35 is secured, it being provided with a crank pin 36, from which a rod 37 extends to and is connected with the treadle connecting piece 7. By operating the treadle this shaft can be revolved. The balance wheel is provided with two belt grooves 38 and 39 for round belts which are preferable in light frames. The larger pulley groove 38, has a belt 40, running to a small pulley 29 for operating the shaker and a belt 41 upon the groove 39, running to a larger pulley to be described.

For assisting in feeding the beans from the hopper at a uniform rate, a loop 42 of a small wire is arranged to extend through the opening 9 in the hopper and the ends of the wire are bent around a rod 43, which is arranged above the plate 20, and across the shaker. The reciprocations of the shaker trough cause the loop 42, to continually pull the beans from the hopper into the shaker.

Upon the boards 32 and 32a, cross pieces 44 are arranged and upon their outer ends conveyer troughs are mounted. Figs. 1 and 8 show but one trough but Figs. 3 and 11 show how two can be arranged upon the same pair of cross pieces, and Fig. 7 shows how the cross pieces are arranged upon the boards 32 and 32a. The troughs are formed of a bottom 45 and beveled sides 46, the bevels of the sides upon their lower ends being spaced from the bottom and leaving a space between said bevels and the bottom for a belt to run. At one end of the conveyer trough a shaft 47 is arranged to be revolved in journal boxes 48 and 49, one of which extends from the side 46 of trough and the other from the post 2, said shaft being provided with a pulley 50 by which it may be driven by the belt 41 from the smaller pulley upon the balance wheel shaft as before referred to. The shaft 47 is also provided with a roller 51, one or two as the number of conveyer troughs to be used in any particular machine being built requires. At the other end of each conveyer trough a similar roller 52, is arranged for revolution in journal boxes 48, each of which is attached to the conveyer trough. Around each of the two rollers of each trough a canvas belt 53, of such width as will fill the space across the trough under the beveled projections of the side pieces, is applied.

Below the conveyer trough and between the legs or posts 2, a box 54 is loosely supported upon the strips 55, which are secured to the legs. This box is for the several sorters upon each side of the machine to throw the defective beans into.

A chute 56 is arranged at the lower end of the shaker, one for each conveyer trough, for directing the beans from the shaker to the conveyers.

It should be observed that the shaker trough is quite long as compared with those in bean sorters now in use. This great length gives opportunity for the dirt and imperfect beans to fall through the slots 21, before reaching the lower end of the shaker. It should also be noticed that the conveyer trough may be one or two, as the amount of dirt in the beans and the quantity of beans to be sorted requires, and that the two conveyers are arranged alongside of the shaker, instead of in alinement with it as in bean sorters of the present construction. This arrangement of the conveyers, while not adding to the length of the device, permits several persons, three or four to each trough are usually employed, to sit alongside of each trough. It also permits the operating treadle board to be as long as the conveyers and be pivotally mounted at each end and be in a position to be operated by either of the persons that may be sorting upon the side of the shaker that the treadle is located. With this arrangement of shaker, conveyers and treadle, while a manually operated machine may have a capacity for employing eight sorters, its bulk and weight can be confined to the strength of a single person for carrying it from one position to another.

The operation of the device is as follows:

A quantity of shelled beans being provided, the hopper is to be filled and its slide adjusted for delivering the beans while the several sorters are to be seated alongside of the conveyer trough or troughs one of the sorters operating the treadle if manually operated, while the sorters as the beans are carried slowly along the conveyer trough have ample time in which to observe the defective ones and pick them out, leaving those that are perfect to pass on and be delivered into any receptacle placed for receiving them.

Having described my invention, what I claim and desire to secure by Letters Patent, is,—

1. In a bean cleaner and sorter having a frame for supporting the mechanism, a hopper adapted to receive shelled beans, mounted upon one end of said frame, an opening in the hopper for their delivery, means for governing their delivery, a shaking screen having a series of slots therein of a width for permitting a half but not a whole bean to pass through, arranged upon an inclination downward from under said opening and of sufficient length for permitting a plurality of persons to sit alongside thereof and sort beans, a trough having a conveyer belt therein arranged alongside of the shaker for receiving the beans therefrom and carrying them from the lower toward the higher end of the shaker, and a treadle for operating the shaker and conveyer consisting of a member pivotally mounted at each end upon the machine frame and arranged in position for being operated by either one of said plurality of bean sorters.

2. In a bean cleaner and sorter having a frame for supporting sorting mechanism, a hopper for receiving and for the delivery of beans and a shaking screen arranged upon an inclination with one end under the hopper of a length for permitting a plurality of persons to sit and sort beans at one side thereof, a conveyer trough adapted for receiving beans from said screen and to carry the beans from its lower toward its higher end at opposite sides of the screen and means for operating said screen and conveyer.

3. In a bean cleaner and sorter having a frame for supporting sorting mechanism, a hopper for receiving and for the delivery of beans and a shaking screen arranged upon an inclination for reciprocation in the direction of its length with one end under said hopper, a wire bent into a loop with its ends hinged to the screen and its looped end extending into the hopper whereby said loop will rest upon the hopper bottom and pull out the last bean as the screen is reciprocated.

Signed by me before two witnesses.

DANIEL E. KRAUSE.

Witnesses:
ANDREW S. DOMINOZOCK,
LOUIS O. KRAUSE.